July 16, 1929.  R. REID  1,721,281
SEPARATING MACHINE
Filed April 30, 1927  2 Sheets-Sheet 1

Inventor:
Robert Reid
by J. Stanley Churchill
atty

July 16, 1929.  R. REID  1,721,281
SEPARATING MACHINE
Filed April 30, 1927    2 Sheets-Sheet 2

Inventor:
Robert Reid
by J. Stanley Churchill
atty.

Patented July 16, 1929.

1,721,281

UNITED STATES PATENT OFFICE.

ROBERT REID, OF BEVERLY, MASSACHUSETTS, ASSIGNOR OF ONE-HALF TO ANDREW S. REID, OF BEVERLY, MASSACHUSETTS.

SEPARATING MACHINE.

Application filed April 30, 1927. Serial No. 187,810.

This invention relates to a separating machine which is particularly designed among other uses, for separating the meat from the bones of that portion of a fish remaining after the filets have been cut off.

The object of the invention is to provide a novel and improved separating machine which is particularly designed to perform the operation of separating the meat which is normally retained by the backbone of a fish after the filets have been cut off, in a rapid, economical and practical manner.

With this object in view and such others as may hereinafter appear, the invention consists in the separating machine hereinafter described and particularly pointed out in the claims at the end of this specification.

Figure 1:
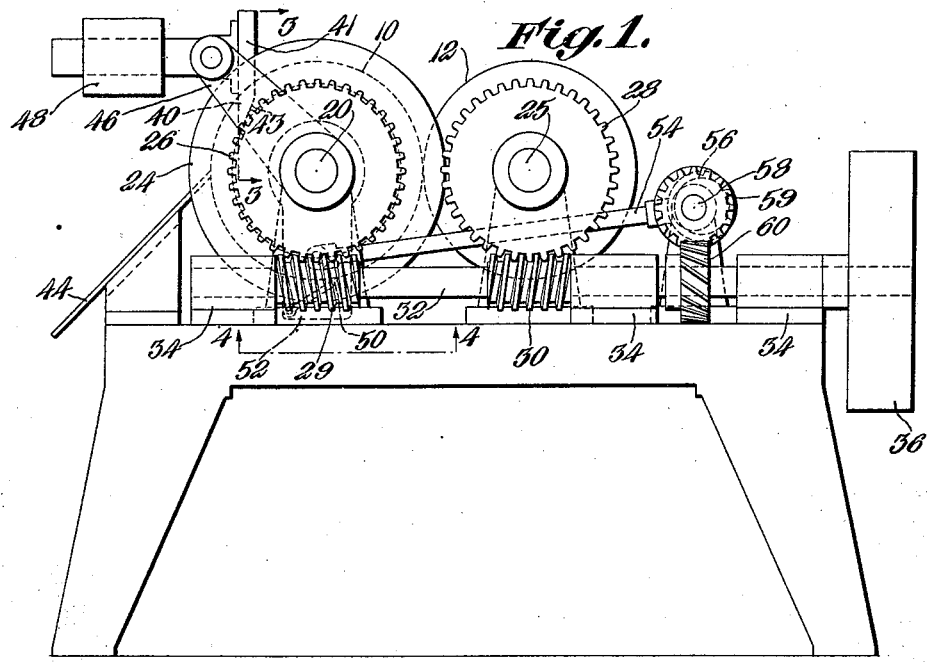
Figure 2:
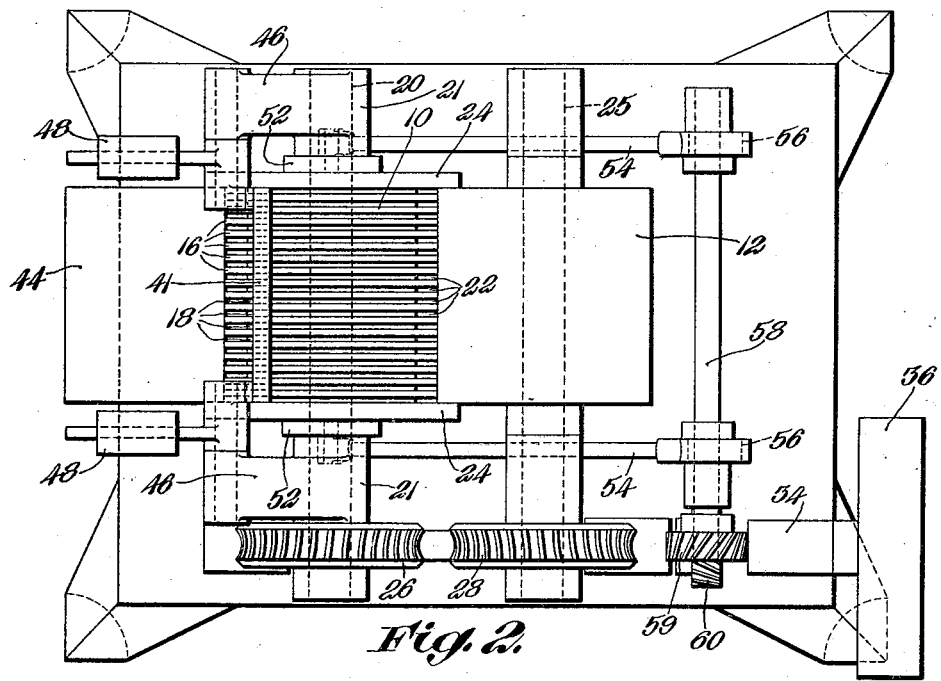
Figure 3:
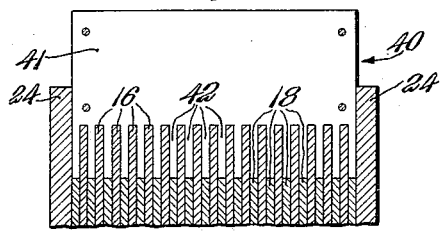
Figure 4:
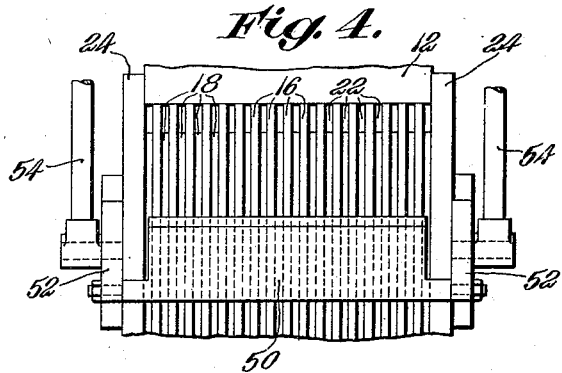
Figure 5:
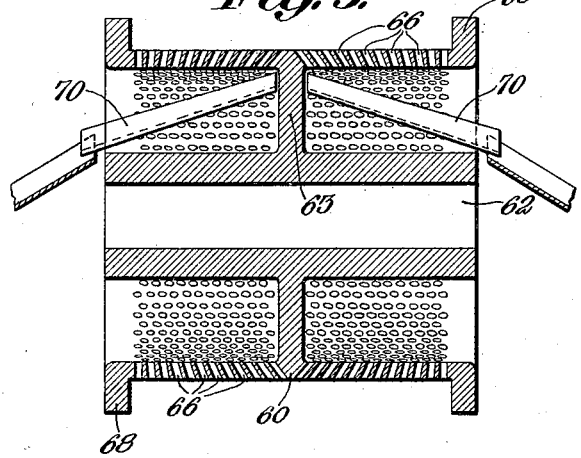
Figure 6:
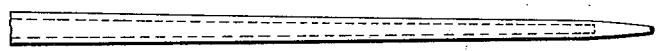
Figure 7:
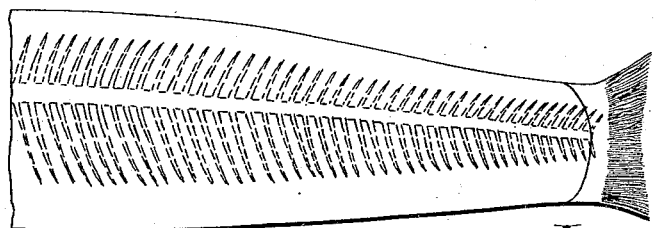

In the drawings which illustrate the preferred embodiments of the invention, Figure 1 is a side elevation of the improved separating machine; Fig. 2 is a plan view of the same; Figs. 3 and 4 are details in section and bottom plan respectively of portions of the machine, viewed on the lines 3—3 and 4—4 of Fig. 1; Fig. 5 is a vertical sectional view of a modified form of a separating member comprising an element of the present machine; and Figs. 6 and 7 are side elevations and plans respectively of the portion of a fish remaining after the filets have been removed and upon which the present machine operates.

At the present time the filets are cut from the opposite sides of a fish, leaving the central backbone consisting of the longitudinal column and the large number of lateral bones extended therefrom, and a considerable amount of the fish meat retained thereby. This portion of the fish is either thrown away or the meat separated by hand, and the principal object of the present invention is to provide a machine in which this fish meat may be separated from the backbone of the fish in a rapid and economical manner enabling the fish meat to be salvaged and the bones to be separated.

In the preferred embodiment of the invention illustrated in Figs. 1, 2, 3 and 4, the machine is provided with a separating member 10 and a presser member 12 preferably in the form of rolls arranged to be rotated in opposite directions and between which may be fed the successive backbones of the fish with the fish meat retained thereby in the condition in which it exists after the filets have been removed. The separating member 10 is provided with openings or spaces and with other portions comprising bearing surfaces for bearing against the bones of the fish and for enabling the presser member 12 to push the fish meat retained between adjacent bones, into the spaces or openings and to thereby separate the fish from the bones. As illustrated in Figs. 1 and 2, the separating member comprises a plurality of metal disks 16 preferably of a non-corrodible metal which are normally spaced apart by interposed spacing members 18, and both of which are mounted upon a shaft 20 journalled in bearings 21 at each side of the machine. The disks 16 and spacing members 18 are normally clamped together and secured in fixed relation to the shaft by flanges 24. The spacing members 18 are of such diameter as to provide annular grooves 22 between adjacent disks 16, and these grooves 22 comprise spaces or openings into which the fish meat is deposited by the cooperate action of the presser member 12 and the ends of the disks 16 which bear against the bones of the fish. As stated, the presser member 12 is herein shown as a roll, provided with a peripheral portion of yieldable material such as rubber, and the roll is mounted upon a shaft 25 journalled in suitable bearings, to occupy a position such that it bears against the periphery of the several disks 16 comprising the separating member 10 in the manner illustrated in Figs. 1 and 2.

Provision is made for driving the separating and presser members 10, 12, and as herein shown the shafts 20, 25 are provided with worm wheels 26, 28 which are arranged to cooperate with right and left worms 29, 30 respectively upon a main driving shaft 32 journalled in suitable bearings 34 upon the machine frame and driven from a driven pulley 36 from a suitable source of power not shown.

In the operation of the machine the pieces or slabs of fish comprising the backbone and the fish meat retained thereby remaining after the usual fillets have been cut off, are fed vertically downwardly, preferably tail portion first, between the rubber presser roll 12 and the separating roll 10. In this position the majority of the smaller bones branching off from the main column extend laterally of the machine and at substantially right angles to the disks 16, and as a result, the yieldable pressure roll 12 acting upon the fibers of the fish meat between the adjacent bones dislodge it from between the bones and force it into the grooves. The backbone of the fish is fed downwardly by the frictional engagement of the presser roll and the separating roll, where it falls through an opening in the bottom frame of the machine and may be caught in a suitable receptacle (not shown) placed beneath the machine. The fish meat accumulating in the grooves 22 passes around to an ejecting station where it is combed out of the grooves by a comb or scraping device 40, herein shown as comprising a bar 41 provided with a series of teeth 42 of a size adapted to extend into the grooves and each having a bevelled portion 43 adapted to bear against the bottom of the grooves and to enable the teeth to scape the fish meat from the grooves and eject it onto a slide 44 where it passes into a suitable receptacle. The scraping bar 40 is pivotally mounted upon arms 46 secured upon and upstanding from the bearings 21. The scraping bar is preferably provided with a counter-weighted portion 48 arranged to enable the scrapers to bear lightly against the bottom of the grooves in order that the effect of the scraper may not destroy the character of the fish meat, and to reduce to a minimum the wear upon the spacing members 18 forming the bottom of the grooves.

In order to insure the complete removal of the fish bones or any particles of skin which might adhere to the surfaces of the disks 16 of the separating member, a reciprocatory scraper member 50 is preferably arranged to bear against the surface of the disks at near the bottom of the separating roll in the manner illustrated in Fig. 1 and in detail in Fig. 4. This scraper member 50 is affixed at its opposite sides to arms 52 pivoted upon the shaft 20 and connected by links 54 to eccentrics 56 upon a counter shaft 58, the latter being driven by cooperating spiral gears 59, 60 upon the counter shaft and main driving shaft 32 respectively.

In Fig. 5 I have illustrated a modified or alternative form of separating member which in some instances I may prefer to employ in the machine instead of the separating member 10 illustrated in Figs. 1 and 2. This alternative separating member comprises a hollow drum 60 preferably of a non-corrodible metal and which is provided with a central bore 62 adapted to permit the drum to be mounted upon the shaft 20. The bore 62 and drum 60 are connected by a central web portion 63 and the periphery of the drum is provided with a large number of small holes 66 and with flange portions 68, the general construction being well illustrated in Fig. 5.

When the drum 60 is embodied in the machine, the presser roll 12 bears against the periphery of the drum running between the flange portion 68. In the operation of the machine the action of the presser roll against the periphery of the drum serves to dislodge the fish meat from the bones and to force the meat through the small holes 66. Provision is made for removing the fish meat from the interior of the hollow drum 60, and as herein shown a series of spiral scrapers 70 are arranged to effect this result.

From the description thus far it will be observed that the present machine enables the fish meat to be readily separated from the bones and the operation performed in a rapid and economical manner. The machine may be readily cleaned and the different parts thereof maintained in efficient operating condition.

While the preferred embodiments of the present invention are particularly adapted for use in separating the fish meat from the bone of the portion of a fish remaining after the fillets have been removed, it will be understood that if found advantageous, the invention may be embodied in machines for other purposes within the scope of the following claims.

Having thus described the invention, what is claimed is:—

1. In a separating machine, in combination, a separating member provided with a plurality of spaced apart openings, a yieldable presser member cooperating therewith, and means for moving said presser member in a direction to assist in effecting feeding of the work between it and the separating member to thereby cause the material to be forced into the openings in the separating member.

2. In a machine of the character specified, in combination, a separating roll provided with a plurality of spaced apart openings, a yieldable presser roll cooperating therewith, and means for moving said presser roll in a direction to assist in effecting the feeding of the work between it and the separating roll to thereby cause the material to be forced into the openings in the separating roll.

3. In a separating machine, in combination, a separating member provided with a plurality of spaced apart bearing portions providing spaces therebetween, and a cooperating presser member having provision for forcing parts of a material positioned between said members into said spaces, said bearing portions serving to prevent other parts of such material from passing into the spaces, and means for automatically removing the separated material from said spaces.

4. In a separating machine, in combination, a rotatable presser roll provided with a yieldable peripheral portion, and a rotatable separating member cooperating therewith provided with a plurality of spaced apart bearing portions providing spaces therebetween, means for rotating said rotatable members in opposite angular directions, and scraping means for removing material from the spaces in said separating member.

5. In a separating machine, in combination, a presser roll, a separating member provided with a plurality of bearing portions and an annular groove between adjacent bearing portions, and means for removing accumulated material from said annular grooves.

6. In a machine of the character specified, in combination, a pair of rotatable rolls, one comprising a separating member being provided with a plurality of spaced apart openings in the peripheral surface thereof, and the other comprising a presser roll constructed and arranged to force into said openings those portions of the material being fed between the rolls, which are positioned over the openings at the bight of the rolls, and to yield to permit passage of the remaining portions of the material through the rolls.

7. In a machine of the character specified, in combination, a pair of rotatable rolls, one comprising a separating member being provided with a plurality of spaced apart openings in the peripheral surface thereof, and the other comprising a presser roll constructed and arranged to force into said openings those portions of the material being fed between the rolls, which are positioned over the openings at the bight of the rolls, and to yield to permit passage of the remaining portions of the material through the rolls, and means for removing the material thus separated from said openings.

8. In a machine of the character specified, in combination, a pair of rotatable rolls, one comprising a separating member comprising a hollow drum provided with a relatively large number of spaced apart openings in the periphery thereof, and the other comprising a presser roll constructed and arranged to force into said openings those portions of the material being fed between the rolls, which are positioned over the openings at the bight of the rolls, and to yield to permit passage of the remaining portions of the material through the rolls, and means for removing the separated material from the interior of the drum.

In testimony whereof I have signed my name to this specification.

ROBERT REID.